US011496472B2

(12) United States Patent
Setlur et al.

(10) Patent No.: US 11,496,472 B2
(45) Date of Patent: Nov. 8, 2022

(54) SYSTEM AND METHOD FOR SECURE ACCESS TO CAMERA SYSTEMS

(71) Applicant: Mutualink, Inc., Wallingford, CT (US)

(72) Inventors: Anand Setlur, Naperville, IL (US); Joseph R. Mazzarella, Tolland, CT (US); Michael S. Wengrovitz, Concord, MA (US); Derrell Lipman, Billerica, MA (US)

(73) Assignee: Mutualink, Inc., Wallingford, CT (US)

( * ) Notice: Subject to any disclaimer, the term of this patent is extended or adjusted under 35 U.S.C. 154(b) by 330 days.

(21) Appl. No.: 16/684,185

(22) Filed: Nov. 14, 2019

(65) Prior Publication Data

US 2020/0162458 A1 May 21, 2020

Related U.S. Application Data

(60) Provisional application No. 62/768,389, filed on Nov. 16, 2018.

(51) Int. Cl.
*H04L 12/751* (2013.01)
*H04L 9/18* (2006.01)
(Continued)

(52) U.S. Cl.
CPC ...... *H04L 63/0876* (2013.01); *H04L 63/0209* (2013.01); *H04N 7/0117* (2013.01);
(Continued)

(58) Field of Classification Search
None
See application file for complete search history.

(56) References Cited

U.S. PATENT DOCUMENTS

| 6,271,752 B1 * | 8/2001 | Vaios | H04N 7/141 |
| | | | 348/E7.086 |
| 6,476,858 B1 * | 11/2002 | Ramirez Diaz | G08B 13/1961 |
| | | | 348/E7.086 |

(Continued)

FOREIGN PATENT DOCUMENTS

| WO | WO2004/017605 A2 | 2/2004 | |
| WO | WO-2010009361 A * | 1/2010 | ......... G08B 21/0476 |
| WO | WO2011/139287 A1 | 11/2011 | |

OTHER PUBLICATIONS

Implementation of HLS Protocol for an IP Camera. Choi. SERSC. (Year: 2014).*

(Continued)

*Primary Examiner* — Venkat Perungavoor
(74) *Attorney, Agent, or Firm* — Sterne, Kessler, Goldstein & Fox P.L.L.C.

(57) ABSTRACT

Embodiments include a system, method, and computer program product that enable secure access to cameras in smart buildings. Some embodiments control outbound video from an environment such as a local network through an intelligent on-event video pushing mechanism. The local intelligent on-event video pushing mechanism hides the IP address of a source video camera, transcodes the video to a reduced size for wide area distribution, and pushes video to a recipient upon an event triggered received within the local environment (e.g., the local network.) Embodiments enable a remote video client on the far-side of the local network firewall to view the video streams of cameras on the near-side of the local network firewall when an event or trigger occurs.

24 Claims, 13 Drawing Sheets

(51) Int. Cl.
*H04L 9/40* (2022.01)
*H04N 19/40* (2014.01)
*H04N 7/01* (2006.01)
*H04N 7/18* (2006.01)
*H04L 12/853* (2013.01)
*H04N 9/797* (2006.01)
*G16Y 40/20* (2020.01)
*H04L 69/08* (2022.01)
*G16Y 20/10* (2020.01)

(52) U.S. Cl.
CPC ............. *H04N 7/181* (2013.01); *H04N 19/40* (2014.11); *G16Y 20/10* (2020.01); *G16Y 40/20* (2020.01); *H04L 69/08* (2013.01)

(56) References Cited

U.S. PATENT DOCUMENTS

| | | | | |
|---|---|---|---|---|
| 6,970,183 | B1* | 11/2005 | Monroe | G08B 7/062 |
| | | | | 348/E7.086 |
| 7,859,396 | B2* | 12/2010 | Monroe | H04L 12/2823 |
| | | | | 340/517 |
| 10,929,465 | B2* | 2/2021 | Henriksen | G06F 9/505 |
| 2011/0025846 | A1* | 2/2011 | Garrett | H04N 7/18 |
| | | | | 348/207.1 |
| 2016/0088326 | A1* | 3/2016 | Solomon | H04N 21/254 |
| | | | | 725/12 |
| 2017/0134466 | A1* | 5/2017 | Giladi | H04N 21/26258 |
| 2017/0237944 | A1* | 8/2017 | Haas | G06Q 20/14 |
| | | | | 348/143 |
| 2020/0119940 | A1* | 4/2020 | Dawes | H04L 12/2809 |
| 2020/0213087 | A1* | 7/2020 | Mazzarella | H04L 9/0637 |
| 2020/0230505 | A1* | 7/2020 | van der Laan | H04L 65/607 |
| 2021/0209614 | A1* | 7/2021 | Bakalis | H04L 9/0827 |

OTHER PUBLICATIONS

Design of Video Surveillance in Wireless Router. Kao. IEEE. (Year: 2013).*
Research on Cluster Remote Video Surveillance System. Yang. IEEEE. (Year: 2006).*
Implementation of HTTP Live Streaming for an IP Camera using an Open Source Multimedia Converter. Yang. SERSC. (Year: 2014).*
IoT-based smart healthcare video surveillance system using edge computing. Rajavel. Springer. (Year: 2020).*
Energy-Efficient Deep CNN for Smoke Detection in Foggy IoT Environment. Khan. IEEE. (Year: 2019).*
IoT-Guard: Event-Driven Fog-Based Video Surveillance System for Real-Time Security Management. Sultana. IEEE. (Year: 2019).*
Smart IoT Surveillance Multi-Camera Monitoring System. Razalli. IEEE. (Year: 2019).*
Controllable Multicast for Adaptive Scalable Video Streaming in Software-Defined Networks. Yang. IEEE. (Year: 2018).*
A Measurement of a Large-scale Peer-to-Peer Live Video Streaming System. Xie. IEEE. (Year: 2007).*
International Search Report and Written Opinion issued in related PCT Application No. PCT/US2019/061834, dated Mar. 27, 2020 (19 pages).

* cited by examiner

SYSTEM AND METHOD FOR SECURE ACCESS TO CAMERA SYSTEMS

CROSS-REFERENCE TO RELATED APPLICATION

This application claims benefit of U.S. Provisional Patent Application No. 62/768,389, filed on Nov. 16, 2018, entitled System and Method for Secure Access to Camera Systems, which is incorporated herein by reference in its entirety.

BACKGROUND

Field

The embodiments generally relate to secure monitoring cameras and video streams.

Background

Current monitoring of camera and video streams are insecure and vulnerable to attack. For example, security-sensitive places like banks employ external security companies to monitor their surveillance cameras and video. The video is typically streamed to a cloud or host site where the external security company monitors the video and the surveillance cameras. Local networks such as Local Area Networks (LANs) or enterprise networks include a firewall to protect the local network from unauthorized access. To allow the external security company to monitor their surveillance cameras and video streams, however, efforts are employed to work around the firewall such as: port mapping, firewall management, virtual private network (VPN) terminations inside the local network, all of which are highly undesirable to network managers (e.g., Enterprise information technology (IT) managers). These efforts compromise the security of the local network. Some of the problems incurred include the following: the source internet protocol (IP) addresses of surveillance cameras being transmitted; security guards in the external security companies having access to and monitoring activities even though they may not have a need to know; and alarm events being sent within a wide area that can be spoofed to create a false trigger event.

BRIEF SUMMARY OF THE INVENTION

What is needed is a system, method, and computer program product that provides secure access to cameras (e.g., surveillance cameras) on a local network (e.g., local area network (LAN), enterprise network) as well as the video streams from those cameras. The secure access may be from within the local network as well as external to the local network (e.g., a remote video viewing client).

Some embodiments include a method for an electronic device on a local network, such as a video pusher, where the video pusher can establish a persistent data connection with a signaling server, where the video pusher is on a local network and is behind a firewall of the local network, and the signaling server is on another side of the firewall. The video pusher can receive first information via the persistent data connection from the signaling server, and based on the first information received, request video data from a camera on the local network. The video pusher can receive the video data requested from the camera, and based on the first information received, transmit the video data received through the firewall. The video data may be transmitted to a video catcher that then transmits the video data to remote video viewing clients, for example.

Before transmitting the video data, video pusher can process the video data received based on the first information received. Non-limiting examples of the processing include: encrypting the video data; transcoding the video format; changing the resolution or frame rate of the video data; changing the video compression of the video data; transforming the video with metadata; obscuring or altering image data; or inserting visual water marks. Based on the first information received, the video pusher can also designate an internet protocol (IP) address or a uniform resource locator (URL) of a recipient; tile multiple camera feeds of the local network including the video data, into a single or fewer video streams; dynamically select or switch video streams from multiple cameras on the local network into a single or fewer video streams; or create low-resolution image thumbnails of the video data or high resolution image subsections of the video data.

The video pusher can also authenticate with the signaling server, request information related to the local network, and in response to the request, receive the first information. Examples of the first information include: data associated with a sensor or an Internet of Things (IoT) device on the local network or another network to which the local network or device on the local network may be connected, such as a sensor unique identification, a serial number, a sensor type, a location, a sensor reading, a reading value, a translated or interpreted meaning of a reading value or series of reading values in the form of a symbol, a state or representation such as a warning, alarm, notification or text message, a numerical value, a visual representation, an audio signal; or other relevant information or data associated with the sensor or conditions relating to the sensor's environment, such as a relative location of a sensor to another object or thing on a geo-referenced or fixed reference coordinate system, a map, a floor plan, or a three-dimensional model.

A sensor or IoT device on the local network may include but is not limited to: a gas sensor; a smoke/fire detector; or a contact closure of a switch or panic button; artificial intelligence or analytics based object, event, condition; state change state detection module that interprets video data, either alone or in concert with other real time, historical or predictive data from other sensors, systems, databases, analytical functions, or information sources, where the sensor itself or when coupled to another device or module causes an alarm, event notification or warning signal to be transmitted to a rules-based or pre-designated recipient agent.

The video pusher may utilize different protocols to make the request for information related to the network. Examples of the types of protocols include but are not limited to a real time publication-subscription, data-sync, or request-response protocol. Examples of those include but are not limited to Message Queueing Telemetry Transport (MQTT) protocol, Extensible Messaging and Presence Protocol (XMPP), Streaming Text Oriented Messaging Protocol (STOMP), Advanced Message Queuing Protocol (AMQP), Web Application Messaging Protocol (WAMP), Java Message Service (JMS), ZeroMQ, or proprietary messaging protocols, where the request may include subscribing to a topic relating to the local network.

The video pusher may be coupled to and/or integrated with a legacy camera, and can convert the first information received to a first format compatible with the legacy camera, and request second video data from the legacy camera. After the second video data is received from the legacy camera, the video pusher can convert the second video data to a second format that is different than the first format, and transmit the second video data in the second format through the firewall. The first format includes video streaming protocols including but not limited to: real time streaming protocol (RTSP), real time messaging protocol (RTMP), hypertext transfer protocol (HTTP), real time transport protocol (RTP), and/or the like.

The camera on the local network can be an internet protocol (IP) camera, a universal serial bus (USB) camera, or an analog camera coupled to an analog to IP converter.

Prior to the transmitting the video, the video pusher may utilize a rules-based software module in conjunction with the first information received. The software module may include instructions stored in memory, and the instructions executed by one or more processors enables the video pusher to determine a recipient of the video data based on rules that include: event data, sensor data, recipient data, or other criteria. For example, event data may include but is not limited to: an event type, an event severity, an event priority, or a date or time. Sensor data may include but is not limited to: a sensor reading, a warning, a state, a condition, a location, or a duration. Recipient data may include but is not limited to the recipient's identity, location, security classification or authorization level, function, skill, capability, or availability. In some embodiments, the rules-based software module is included inside the camera.

Some embodiments include a method for an electronic device that may include for example, a signaling server. A signaling server can authenticate a video pusher on a local network, establish a persistent data connection with the video pusher, where the video pusher is behind a firewall on the local network and the electronic device is on another side of the firewall, receive an event signal associated with the local network, and based on the event signal received, transmit a message via the persistent data connection that designates which camera on the local network streams video data. The signaling server can transmit the message is based on real time publication-subscription, data-sync, or request-response protocol, such as, but not limited to, MQTT, XMPP, STOMP, AMQP, WAMP, JMs, ZeroMQ, or proprietary messaging protocols.

The message transmitted can include instructions for processing the video data that is streamed. Examples of the processing include but are not limited to: encrypting the video data; changing the resolution or frame rate of the video data; and/or changing the video compression codec of the video data. Additional examples of the processing include but are not limited to: designating an IP address or uniform resource locator (URL) of a recipient of the video data streamed; tiling multiple camera feeds of the local network including the video data streamed, into a single or fewer video streams; dynamically selecting or switching streams video streams from multiple cameras on the local network into a single or fewer video streams; and/or creating low-resolution thumbnails of the video data streamed.

To authenticate a video pusher on a local network, the signaling server can receive from the video pusher, a subscription to topics relating to the local network, where the message transmitted includes information based on the subscription. The event signal received may be based on a first protocol format, and the signaling server can convert the event signal received to a second protocol format that is different than the first protocol format, where the message transmitted is based on the second protocol format.

The signaling server can communicate with more than one video pusher. For example, the signaling server can receive a second event signal associated with a different local network, and based on the second event signal received, transmit a second message to a second video pusher indicating which second camera on the different local network streams second video data.

Some embodiments include a method for an electronic device that may include a video catcher. A video catcher can receive a request from a remote video viewing client, where the request is based on a map of a local network, where the remote video viewing client is not on the local network. The video catcher can transmit an event signal based on the request received to a signaling server, subsequently receive video data from the local network associated with the event signal transmitted, and then transmit the video data received to the remote video viewing client.

Further embodiments, features, and advantages, as well as the structure and operation of the various embodiments, are described in detail below with reference to accompanying drawings. It is noted that the embodiments are presented herein for illustrative purpose only. Additional embodiments will be apparent to persons skilled in the relevant art(s) based on the teachings contained herein.

BRIEF DESCRIPTION OF THE DRAWINGS/FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION

Figure 1:
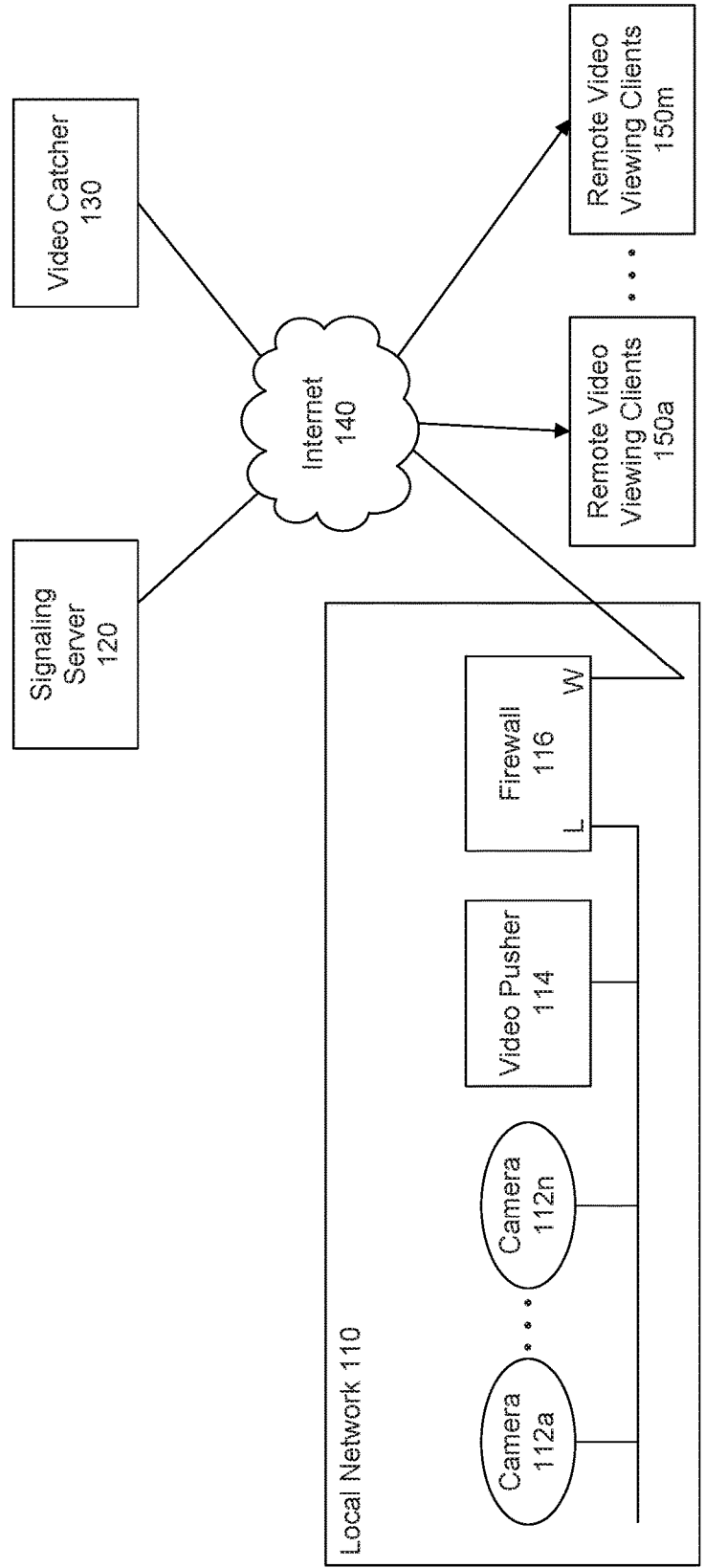
FIG. 1 illustrates a block diagram of a system that provides secure access to cameras in smart buildings, according to an example embodiment.

FIG. 1 illustrates a block diagram of system 100 that provides secure access to cameras in smart buildings, according to an example embodiment. System 100 may include local network 110 (e.g., local area network (LAN), enterprise network), signaling server 120, video catcher 130, Internet 140 (e.g., a wide area network (WAN)) and remote video clients 150a-150m. Local network 110 may include firewall 116 where L indicates the side coupled to a LAN and W indicates the side coupled to a WAN. Local network 110 may also include video pusher 114 and one or more cameras 112a-112n (e.g., surveillance camera systems, where each camera system 112 may be different.) Even though camera systems 112 may be different, the communications to and from camera systems 112 may be via internet protocol (IP). Thus, communications such as signaling to and from and/or streaming video may be converted to IP. Local network 110 may be located inside a smart building, a building that includes Internet of Things (IoT) devices and/or sensors that can generate events or trigger an event (e.g., fire alarm, intruder detected.) In some embodiments, local network 110 may be located in proximity to or adjacent to sensors and/or IoT devices in a smart building, but not in a smart building or not in the same smart building.

Some embodiments enable one or more remote video viewing clients 150 (on the WAN/far-side of firewall 116) to securely view video streams of cameras 112 (on the LAN/near-side of firewall 116) when an event or trigger occurs. Video pusher 114 is located inside local network 110 and behind firewall 116, may be coupled to signaling server 120 and video catcher 130, typically located in a cloud. The coupling occurs in secure manner, yet system 100 requires no port mapping, no firewall management, and no use of VPN terminations inside the enterprise, all of which are highly undesirable to Enterprise IT managers.

One or more of the devices or systems shown (e.g., video pusher 114, signaling server 120, video catcher 130, remote video viewing client 150, and/or camera 112 (e.g., surveillance camera, IP camera, USB camera, legacy camera, analog camera) may be implemented on one or more computing devices using hardware, software, or a combination thereof. Such a computing device may include, but is not limited to, a device having a processor and memory, including a non-transitory memory, for executing and storing instructions. The memory may tangibly embody the data and program instructions. Software may include one or more applications and an operating system. Hardware may include, but is not limited to, a processor, memory, and graphical user interface display. The computing device may also have multiple processors and multiple shared or separate memory components. For example, the computing device may be a part of or the entirety of a clustered computing environment.

Figure 2:
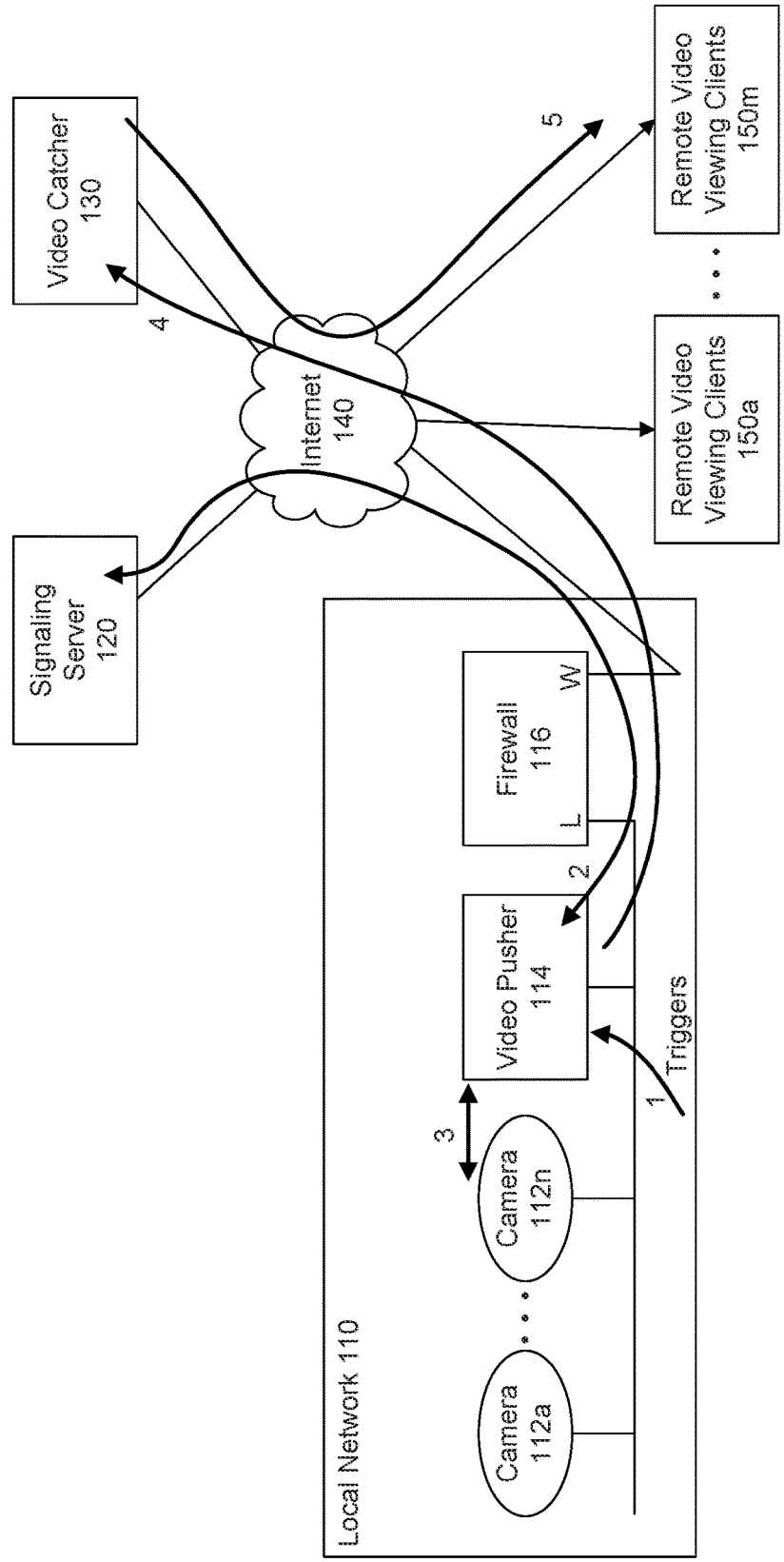
FIG. 2 illustrates operation of a system, according to an example embodiment.

FIG. 2 illustrates operations of system 200, according to an example embodiment: An event or trigger arrives at video pusher 114, in Step 1, and video pusher 114 establishes a persistent data connection (e.g., a persistent outbound TCP connection) to signaling server 120. Subsequent communication with signaling server 120 in Step 2 is accomplished in a firewall-friendly manner—that is the data connection persists and is maintained, for example using keep-alive pings, so that signaling server 120 can send information back across this same socket, back through the firewall, to video pusher 114. Video pusher 114 then requests and receives video from one or more cameras 112 in Step 3, suitably processes their video streams, and then relays these to video catcher 130 in Step 4. Video catcher 130 then suitably processes, fans-out, and transmits the video streams to one or more authorized remote video viewing clients 150 in Step 5. In an embodiment, the persistent data connection may be established after video pusher 114 is powered up (e.g., at start-up.)

Figure 3:
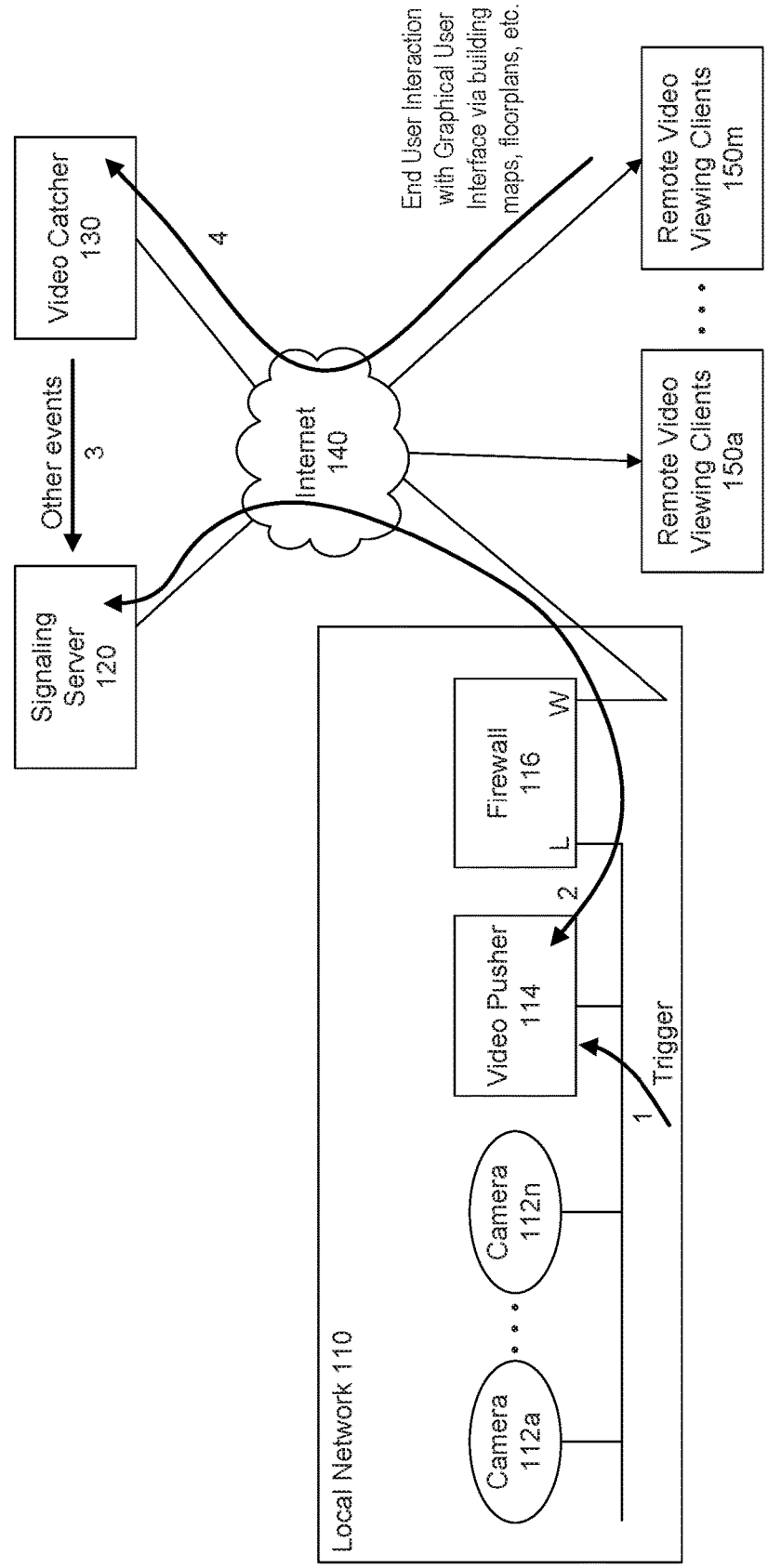
FIG. 3 illustrates various types of events/triggers in operation in a system, according to an example embodiment.

FIG. 3 illustrates various types of events/triggers in system 300, according to an example embodiment. The events/triggers arriving at signaling server 120 can arrive from various multiples sources, including IoT devices and sensors resident in local network 110, and/or other enterprise and/or cloud-based systems which communicate with sensors, and/or video catcher 130, and the like. Events or triggers may include signals from applications on mobile devices, panic buttons, or emergency buttons. Events or triggers may be received by an aggregator (not shown) on local network 110, and the aggregator transmits the event or trigger to video pusher 114.

For example, video catcher 130 might also interact with remote video viewing clients 150, such that when one or more of these remote video viewing clients 150 views and/or interacts with a graphical user interface via an indoor-building map or floor plan, an event sent from video catcher 130 to signaling server 120 thereby triggers the outbound flow of one or more video streams from video pusher 114. Or, if an enterprise-based sensor, such as a gas sensor, smoke/fire-detector, or a contact closure from a switch or panic button, located in the smart building provides a trigger/event message to signaling server 120, this in turn can cause video pusher 114 to start pushing out the video from cameras 112 in local network 110. In this manner, local network 110 efficiently uses its outbound Internet bandwidth, since video streams are only pushed out from certain cameras 112, and at certain times, dependent upon the receipt of the event/trigger.

In some embodiments, the persistent connection between video pusher 114 and signaling server 120 is established in Step 2 on a just-in-time basis, and only when an emergency trigger in Step 1 occurs, such as from a smart building IoT based sensor or a system. The trigger in Step 1 might also be caused by video analytics and processing implemented by video pusher 114 itself or another system. At the conclusion of the emergency event, this data connection is torn down. In some embodiments, after the data connection is established in Step 2, other events from video catcher 130 might arrive at signaling server 120 in Step 3 which in turn interacts with video pusher 114 over the persistent data connection. For example, video catcher 130 might also interact with remote video viewing clients 150 in Step 4, such that when one or more of these remote video viewing clients 150 views and/or interacts with an indoor-building map, an event sent from video catcher 130 to signaling server 120 at Step 3 thereby causes the outbound flow of one or more video streams from video pusher 114. In some embodiments, an enterprise-based sensor, such as a gas sensor, smoke/fire-detector, or a contact closure from a switch or panic button, provides a trigger message at Step 1 to signaling server 120; this in turn can cause video pusher 114 to start pushing out the video from cameras 112 in the Enterprise (e.g., local network 110.) In this manner, the Enterprise (e.g., local network 110) efficiently uses its outbound Internet bandwidth, since video streams are only pushed out from certain cameras, and at certain times.

Figure 4:
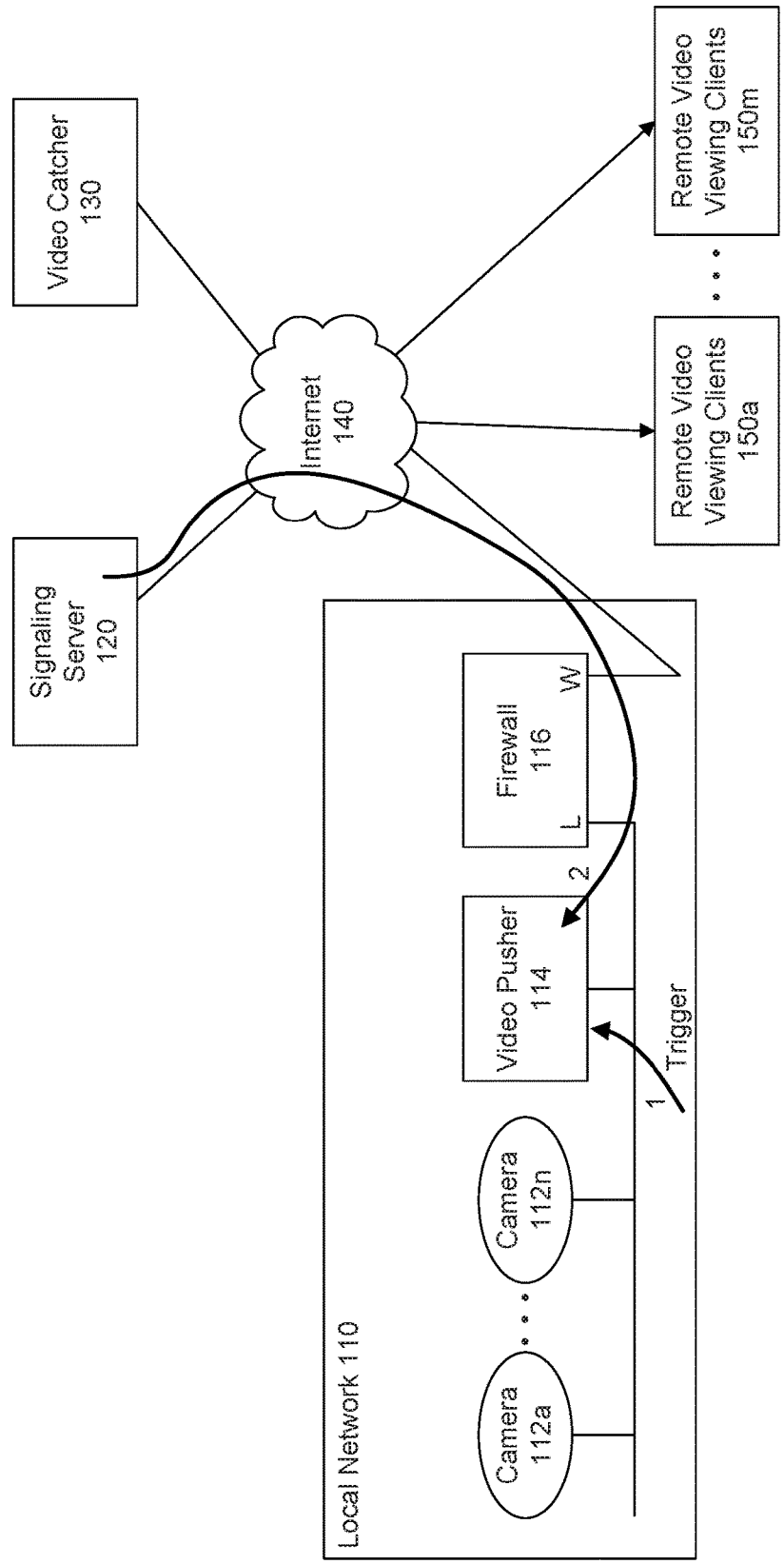
FIG. 4 illustrates a signaling method through a firewall in operation in a system, according to an example embodiment.

FIG. 4 illustrates a signaling method through firewall 116 in system 400, according to an example embodiment. An example signaling method for communicating between signaling server 120 and video pusher 114 is Message Queueing Telemetry Transport (MQTT), and other protocols may also be used. Video pusher 114 for a specific local network 110 authenticates with signaling server 120, and requests messages related to its own local network 110. In the case where the signaling method is MQTT, this would be subscribing to topics/subtopics relating to its own local network 110. For example, video pusher 114 might receive a message published by signaling server 120 in Step 2, designating which camera 112a or cameras 112a-112f, for example, to stream, and whether or not to also stream each camera's audio. The JSON message content within video pusher 114's subscribed MQTT topic/subtopic messages is used to precisely control video pusher 114's processing/relaying, as described further in FIG. 8.

In some embodiments, the signaling connection between video pusher 114 and signaling server 120 would only occur when a significant emergency trigger occurred. In some embodiments, the connection might also be established whenever video pusher 114 starts up, if approved by the local network 110.

Figure 5:
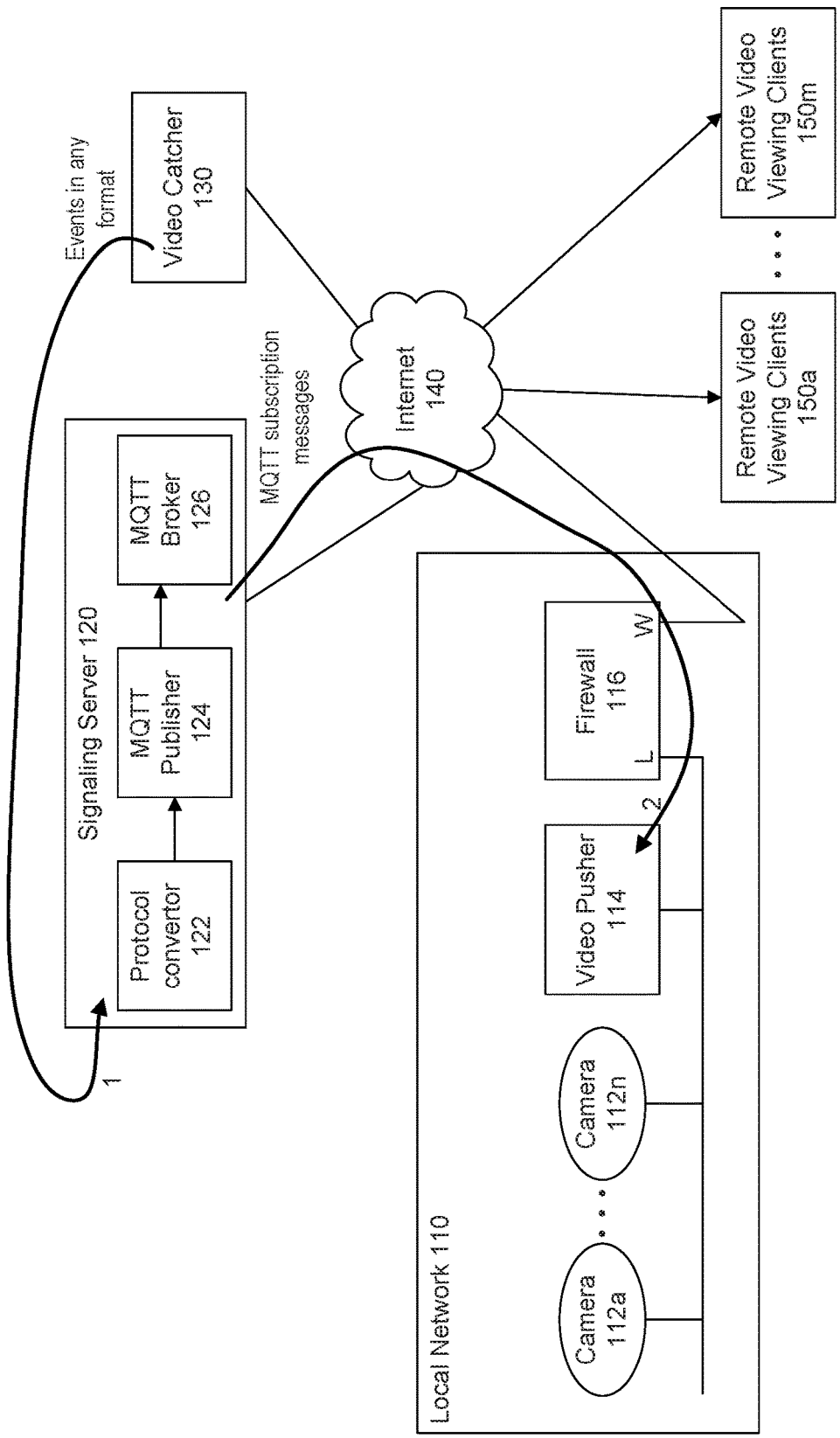
FIG. 5 illustrates a signaling server in a system, according to an example embodiment.

FIG. 5 illustrates signaling server 120 in system 500, according to an example embodiment. Note that the signaling format of the events/triggers arriving in Step 1, might be entirely different than the signaling format used in Step 2 for which an example protocol is MQTT. For example signaling server 120 might receive HTTP POSTs/GETs from one or more other sources in Step 1, and suitably convert these multiple/different message formats into the MQTT topic/sub-topic JSON messages transmitted within video pusher 114's subscription messages in Step 2. Note that a single signaling server 120 might handle the MQTT subscription messages to video pushers 114 a-f within multiple local networks 110a-110e. For example, using signaling server 120, an event/trigger arriving from a sensor in local network 110a might control the video pushing out from local network 110a, and an event/trigger arriving from a sensor in local network 110b (not shown) might cause the video pushing out from local network 110b.

Figure 6:
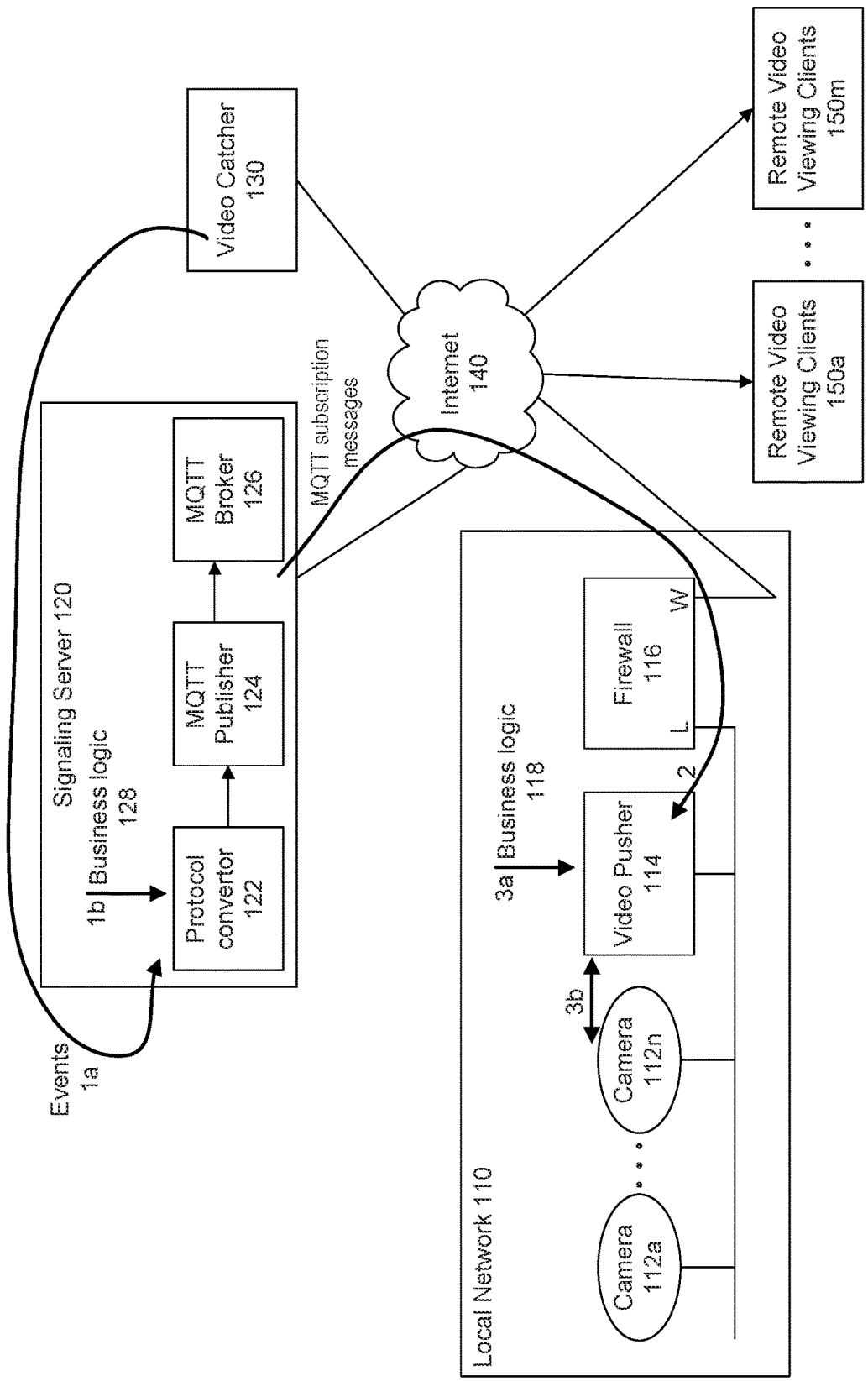
FIG. 6 illustrates a video pusher in a system, according to an example embodiment.

FIG. 6 illustrates video pusher 114 in system 600, according to an example embodiment. Video pusher 114 integrates with legacy IP cameras 112, using their existing protocols such as RTSP, RTMP, HTTP, RTP, etc. For example, an event/trigger from a smoke detector sent from the 3rd floor of Building 123 might cause video pusher 114 to request and receive video streams from all legacy cameras 112 on the 3rd floor in step 3, which are then suitably processed and pushed out to video catcher 130. In some embodiments, configurable business logic 128 in signaling server 120 at step 1b would convert the receipt of a single event at Step 1a in order to specify the details of which cameras 112 are selected, how they are processed, etc., within the MQTT topic/subtopic JSON message/messages sent in Step 2. In yet another embodiment, business logic 118 might be configured and applied at Step 3a by video pusher 114 instead of, or in addition to, signaling server 120. Accordingly, video pusher 114 requests and receives video streams at Step 3b.

Figure 7A:
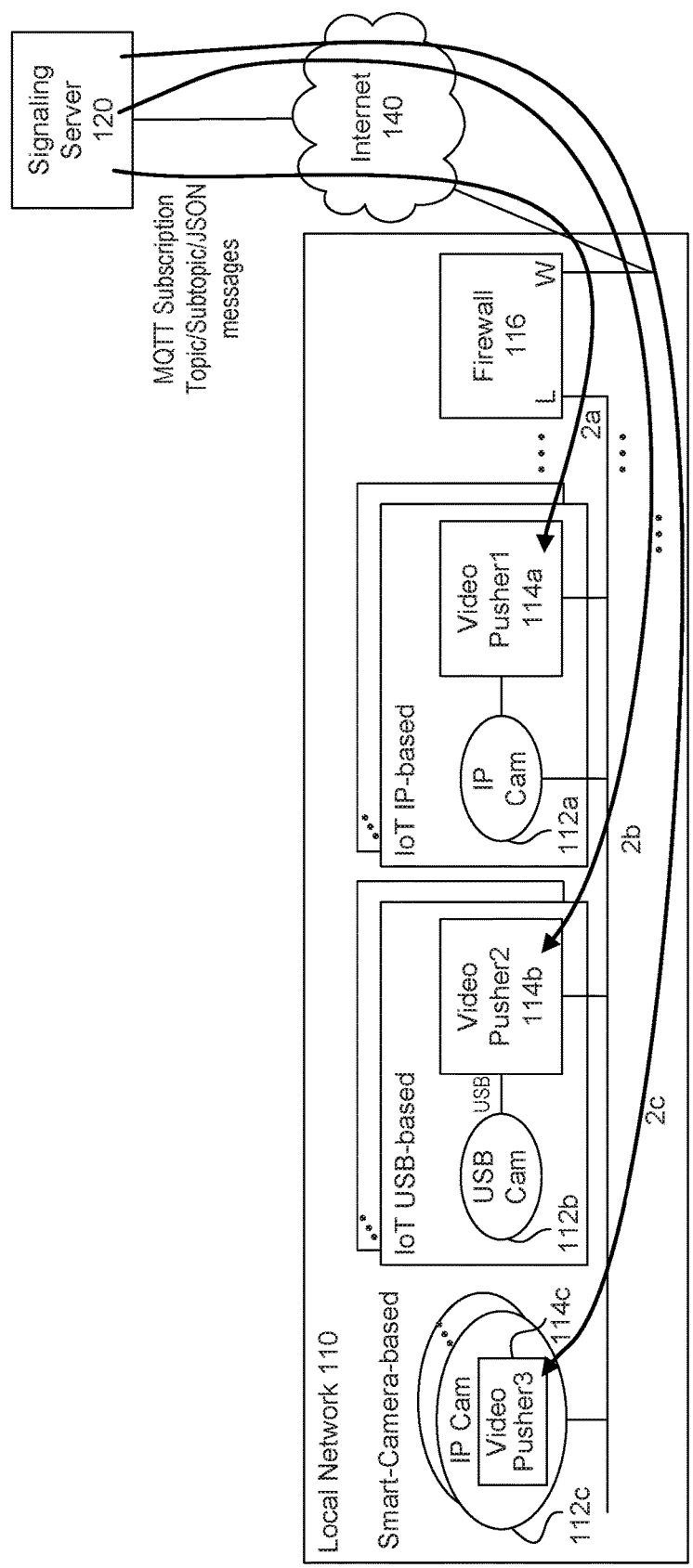
FIG. 7A illustrates more than one video pusher in a system, according to an example embodiment.

FIG. 7A illustrates more than one video pusher 114 in system 700, according to an example embodiment. In addition to the single video pusher 114 per local network 110 depicted in the previous figures, video pusher 114 functions may be decentralized where each video pusher 114 is responsible for a subset of cameras 112. In an embodiment IoT IP-based video pusher1 114a includes an IoT processor such as Raspberry Pi or the like, is IP-coupled to IP camera 112a, and provides control, processing and video pushing of only that single IP camera 112a. In another embodiment IoT USB-based video pusher2 114b includes an IoT processor such as Raspberry Pi or the like, is USB-coupled to USB camera 112b, thereby not only converting signals from a USB camera 112b to that of an IP camera 112, but also applying control, processing and video push out dependent upon receipt of MQTT topic/subtopic JSON messages received from signaling server 120. In another embodiment Smart-Camera-based video pusher3 114c might be included inside of a smart camera 112c. In some embodiments, signaling server 120 would communicate with each edge-based element via persistent firewall-friendly protocols such as MQTT, or equivalent in corresponding Steps 2a, 2b, and/or 2c.

Figure 7B:
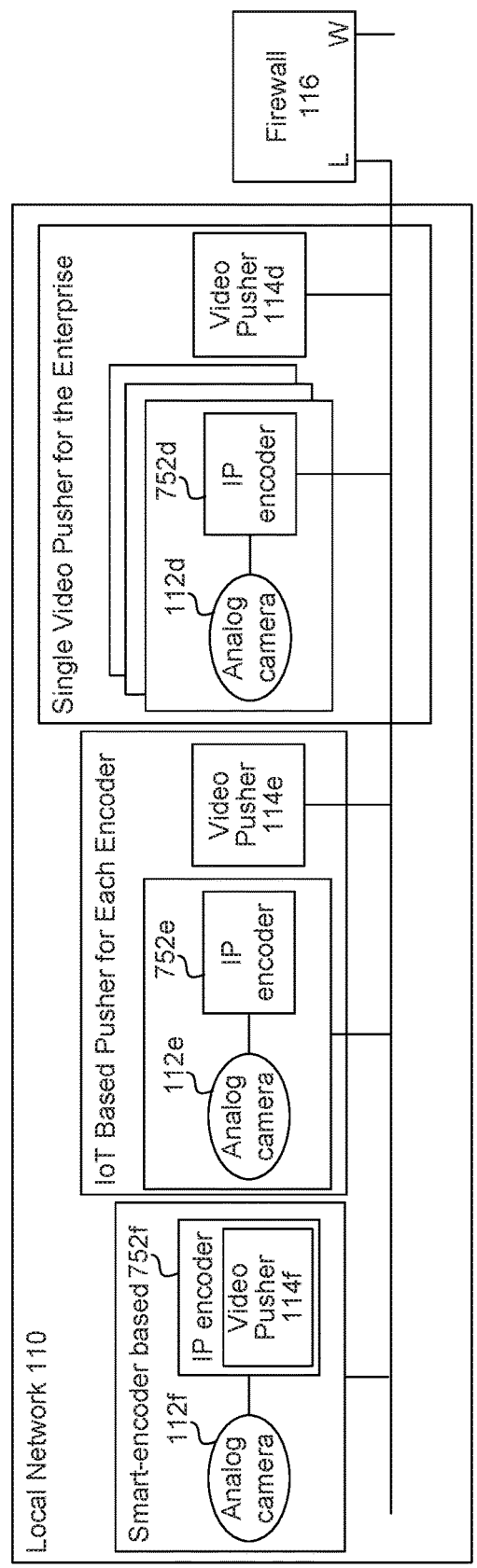
FIG. 7B illustrates more than one video pusher in a system with analog cameras, according to an example embodiment.

FIG. 7B illustrates more than one video pusher 114 in system 700 with analog cameras 112, according to an example embodiment. Video pusher 114 functions may be decentralized where each video pusher 114 is responsible for a subset of analog cameras 112 through use of IP encoders 752. Multiple embodiments exist, such as a single video pusher 114d is used for multiple combinations of analog cameras 112d and IP encoders 752; IoT-based video pusher 114e associated with each combination of analog camera 112e and IP encoder 752e; and/or video pusher 114f can be embedded in IP encoder 752f's hardware or software, where IP encoder 752f can be coupled to analog camera 112f.

Figure 8:
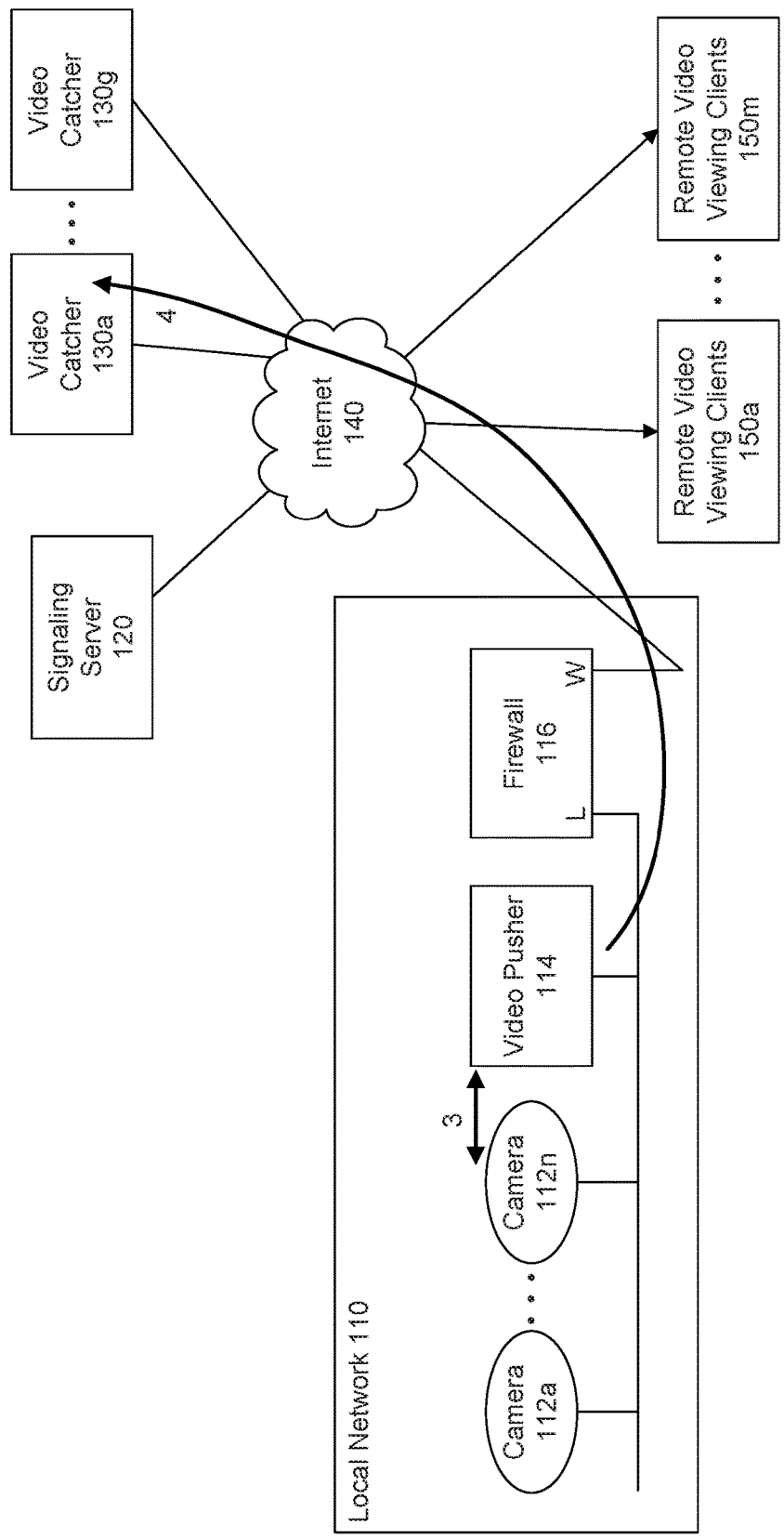
FIG. 8 illustrates interactions within a system, according to an example embodiment.

FIG. 8 illustrates interactions within system 800, according to an example embodiment. Video pusher 114 can suitably process the video pulled from each camera 112 at Step 3 before sending the video stream out. In this manner, video pusher 114 might be commanded to: encrypt the video stream prior to pushing the video stream out, change the resolution/frame rate of the video stream being pushed out, change the video compression codec of the video stream being pushed out, designate the IP address/URL of the recipient video catcher 130 in Step 4, tile multiple camera feeds into a single or fewer video streams, dynamically select/switch video streams from multiple cameras 112 into a single or multiple/fewer video streams, create low-res thumbnails for minimized bandwidth consumption, apply video analytics, and the like. There are many possibilities, variations, and combinations, and system 800 is highly extensible for including and adding future functionality. Signaling server 120 might also communicate with video catcher 130, using MQTT or other protocols, so that resources are dynamically provisioned on video catcher 130 when video pusher 114 starts pushing out a video stream. For example, video catchers 130a-130g might be automatically created on-the-fly, on an as-needed basis in the cloud, and running concurrently, dependent on when video pushing commences.

Figure 9:
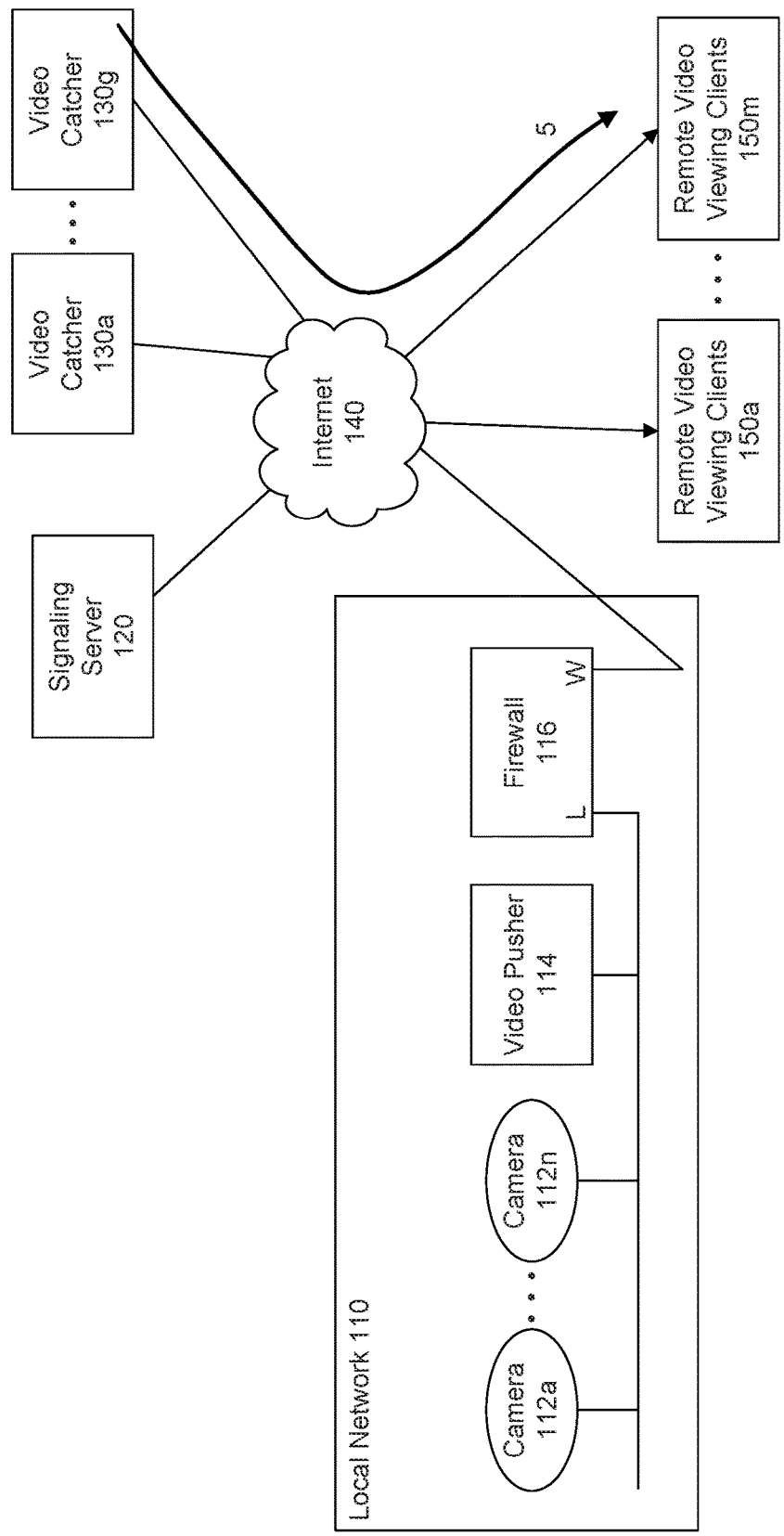
FIG. 9 illustrates a video catcher in a system, according to an example embodiment.

FIG. 9 illustrates video catcher 130a in system 900, according to an example embodiment. The role of video catcher 130a is to receive a video stream being pushed out from video pusher 114, and fan this out to multiple authorized recipients, remote video viewing clients 150. The media services provided by video catcher 130 might be integrated with other Web services such in-door interactive building maps, Push to Talk and other voice communication services (so that viewers of the in-building video can talk about what they are seeing), interoperability system services (so that viewers seeing the in-building video streams being pushed out can communicate with legacy LMR radio users), etc. In some embodiments, video catchers 130 are dynamically provisioned and spun-up on an as-needed basis; video catchers 130 are capable of running concurrently and supplying video streams to both desktop and smartphone/mobile clients.

Figure 10:
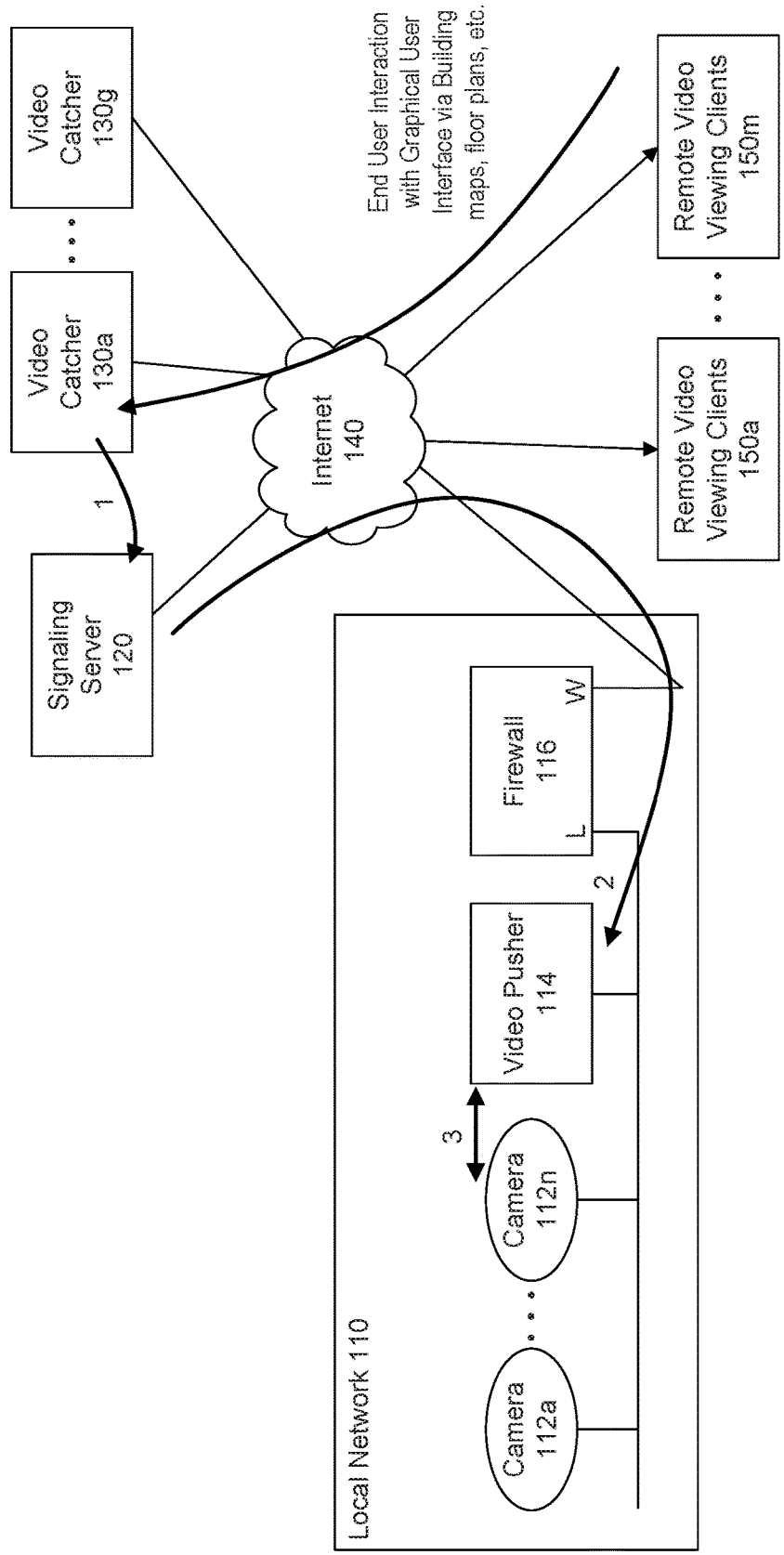
FIG. 10 illustrates user interaction in a system, according to an example embodiment.

FIG. 10 illustrates user interaction in a system 1000, according to an example embodiment. Users might interact with their remote video viewing clients 150 to control video pushing and camera 112 operations. For example, an end-user might cause Pan-Tilt-Zoom (PTZ) operations on a camera 112, for example by converting between HTTP POST events received in Step 1, MQTT Received in Step 2, and open network video interface forum (ONVIF) stream data received in Step 3.

Figure 11:
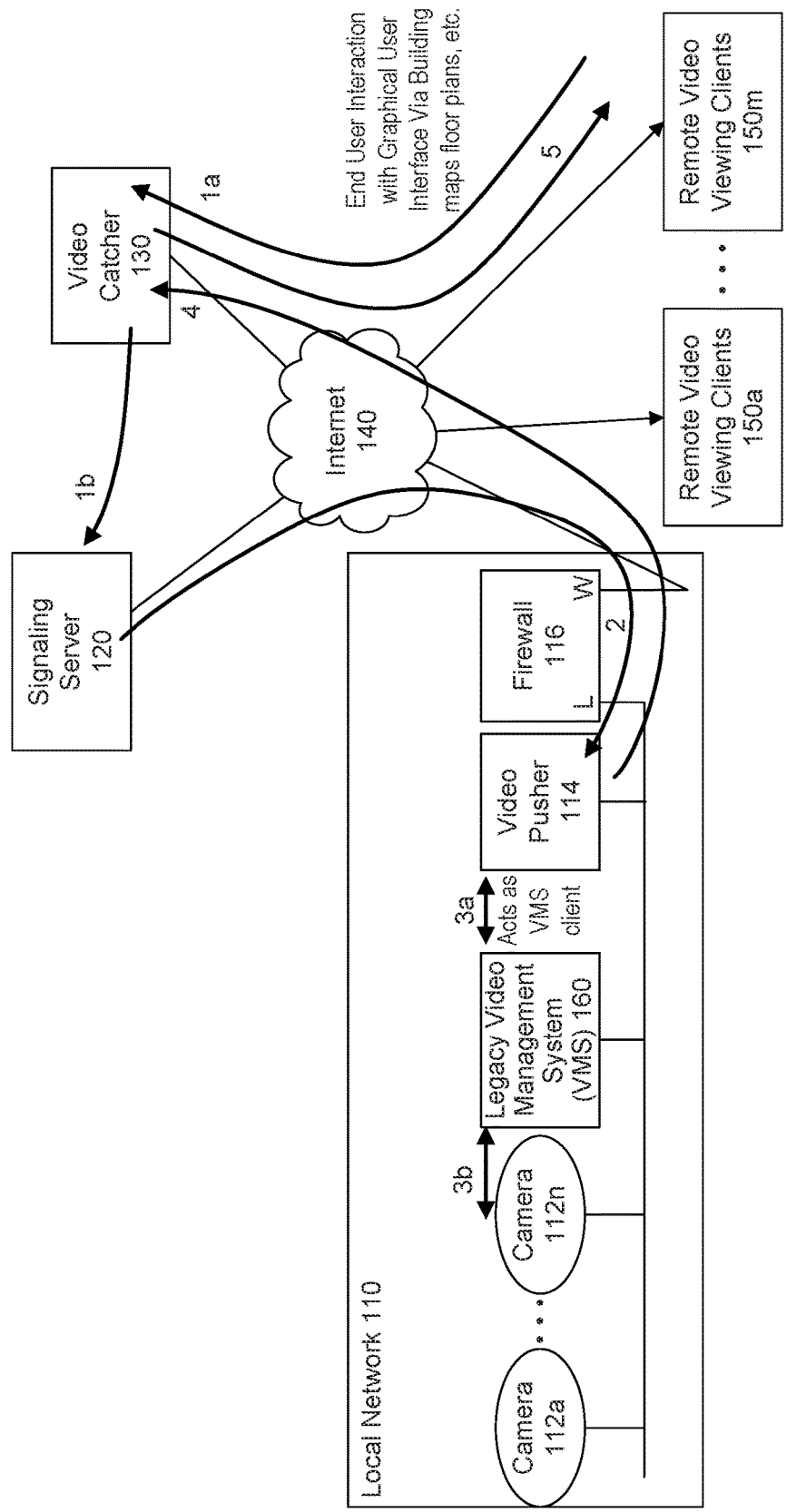
FIG. 11 illustrates video management system (VMS) integration in a system, according to an example embodiment.

FIG. 11 illustrates video management system (VMS) 160 integration in system 1100, according to an example embodiment. The systems and methods described in the previous figures are also applicable to VMS systems 160 also called legacy VMS system 160. In an embodiment, on one side (in Step 2) video pusher 114 exchanges information via MQTT subscription messages, and on side two (in Step 3*a*) acts as a standard (e.g., premise-based) VMS client into legacy (e.g., premise-based) VMS system 160. In this manner, remote video viewing clients 150 can view and interact (stop, pause, fast-forward, etc) recordings in legacy VMS 160, can push out already-tiled versions of multiple camera feeds, can initiate PTZ scenes involving multiple cameras, and the like.

Persons of ordinary skill in the art will recognize that the use of the terms "enterprise" and "smart buildings" are exemplary indications of the applicability of the innovative solutions described herein. These solutions are applicable to both stationary and mobile applications and environments where secure monitoring of cameras and video streams is desired. Some embodiments of stationary applications and environments include but are not limited to: enterprises; smart buildings; campuses; farms; and/or precincts and regions. Some embodiments of mobile applications and environments include but are not limited to: automotive and emergency vehicles; public, private, and school buses; other transportation systems (e.g., rail systems, subway systems, airplanes, water vehicles); and/or unmanned aerial vehicles (UAVs)/drones. In these various solutions, the term "local network" is used broadly to include networks that are managed in stationary and/or mobile environments (e.g., enterprises, smart buildings, buildings, campuses, farms, precincts and regions, automotive and emergency vehicles, and buses) with a firewall separation from the outside world. It is further understood that connectivity to cameras and sensors includes both direct connection, as well as connections via video management system, and similar software. It is also understood that non-IP sensors and non-IP devices are addressed by this solution by using IP communication devices that may be coupled to these non-IP sensors and non-IP devices to provide IP connectivity (bidirectional IP connectivity, as required) for these sensors and devices.

System Implementation

Figure 12:
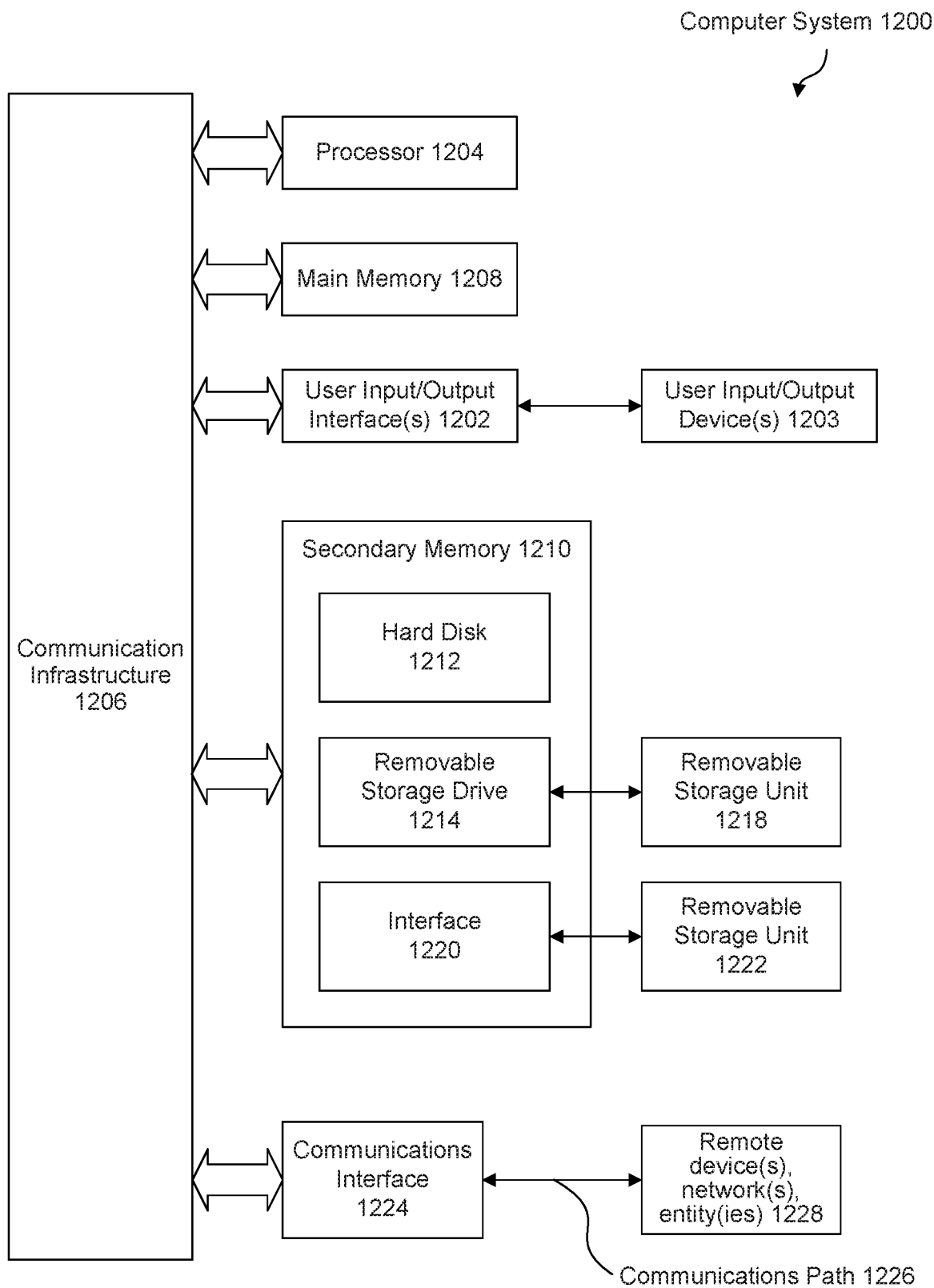
FIG. 12 is a diagram of an example computing system, according to an example embodiment.

Various embodiments can be implemented, by software, firmware, hardware, or a combination thereof. FIG. 12 illustrates and example computer system 1200 in which the systems and devices described within various embodiments can be implemented as computer-readable code and/or text-readable code. After reading this description, it will become apparent to a person skilled in the relevant art how to implement the embodiments using other systems and/or processing architectures. For example, a video pusher, signaling server, video catcher, camera, and/or a remote video viewing client may be implemented by computer system 1200.

Computer system 1200 includes one or more processors (also called central processing units, or CPUs), such as a processor 1204. Processor 1204 is connected to a communication infrastructure or bus 1206. One or more processors 1204 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1200 also includes user input/output device(s) 1203, such as monitors, keyboards, pointing devices, etc., that communicate with communication infrastructure 1206 through user input/output interface(s) 1202. Computer system 1200 also includes a main or primary memory 1208, such as random access memory (RAM). Main memory 1208 may include one or more levels of cache. Main memory 1208 has stored therein control logic (i.e., computer software) and/or data.

Computer system 1200 may also include one or more secondary storage devices or memory 1210. Secondary memory 1210 may include, for example, a hard disk drive 1212 and/or a removable storage device or drive 1214. Removable storage drive 1214 may be a floppy disk drive, a magnetic tape drive, a compact disk drive, an optical storage device, tape backup device, and/or any other storage device/drive.

Removable storage drive 1214 may interact with a removable storage unit 1218. Removable storage unit 1218 includes a computer usable or readable storage device having stored thereon computer software (control logic) and/or data. Removable storage unit 1218 may be a floppy disk, magnetic tape, compact disk, DVD, optical storage disk, and/any other computer data storage device. Removable storage drive 1214 reads from and/or writes to removable storage unit 1218 in a well-known manner.

According to an exemplary embodiment, secondary memory 1210 may include other means, instrumentalities or other approaches for allowing computer programs and/or other instructions and/or data to be accessed by computer system 1200. Such means, instrumentalities or other approaches may include, for example, a removable storage unit 1222 and an interface 1220. Examples of removable storage unit 1222 and interface 1220 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1200 may further include a communication or network interface 1224. Communication interface 1224 enables computer system 1200 to communicate and interact with any combination of remote devices, remote networks, remote entities, etc. (individually and collectively referenced by reference number 1228). For example, communication interface 1224 may allow computer system 1200 to communicate with remote devices 1228 over communications path 1226, which may be wired and/or wireless, and which may include any combination of LANs, WANs, the Internet, etc. Control logic and/or data may be transmitted to and from computer system 1200 via communication path 1226.

In an embodiment, a tangible apparatus or article of manufacture comprising a tangible computer useable or readable medium having control logic (software) stored thereon is also referred to herein as a computer program product or program storage device. This includes, but is not limited to, computer system 1200, main memory 1208, secondary memory 1210, and removable storage units 1218 and 1222, as well as tangible articles of manufacture embodying any combination of the foregoing. Such control logic, when executed by one or more data processing devices (such as computer system 1200), causes such data processing devices to operate as described herein.

Based on the teachings contained in this disclosure, it will be apparent to persons skilled in the relevant art(s) how to make and use embodiments of the invention using data processing devices, computer systems and/or computer architectures. In particular, embodiments may operate with software, hardware, and/or operating system implementations other than those described herein.

CONCLUSION

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

The breadth and scope of the invention should not be limited by any of the above-described exemplary embodiments, but should be defined only in accordance with the following claims and their equivalents.

What is claimed is:

1. A method for an electronic device on a local network, comprising:
   establishing a persistent data connection with a signaling server, wherein the electronic device is behind a firewall of the local network and the signaling server is on another side of the firewall;
   subscribing to a topic relating to the local network;
   receiving first information corresponding to the topic via the persistent data connection from the signaling server;
   based on the first information received, requesting video data from a camera on the local network;
   receiving the video data requested from the camera; and
   based on the first information received, transmitting the video data received through the firewall.

2. The method of claim 1, further comprising processing the video data received based on the first information received before transmitting the video data, wherein the processing comprises: encrypting the video data; transcoding a video format of the video data; changing a resolution or a frame rate of the video data; changing a video compression of the video data; transforming the video with metadata; obscuring or altering image data; or inserting visual water marks.

3. The method of claim 1, further comprising:
   designating an internet protocol (IP) address or a uniform resource locator (URL) of a recipient;
   tiling multiple camera feeds of the local network including the video data, into a single or fewer video streams;
   dynamically selecting or switching video streams from multiple cameras on the local network into a single or fewer video streams; or
   creating low-resolution image thumbnails of the video data or high resolution image subsections of the video data.

4. The method of claim 1, further comprising:
   authenticating with the signaling server;
   requesting information related to the local network; and
   in response to the requesting, receiving the first information.

5. The method of claim 4, wherein the requesting is based on a real time publication-subscription, data-sync, or request-response protocol, such as, but not limited to, Message Queueing Telemetry Transport (MQTT) protocol, XMPP, STOMP, AMQP, WAMP, JMs, ZeroMQ, or proprietary messaging protocols.

6. The method of claim 1, further comprising:
   integrating with a legacy camera;
   converting the first information received to a first format compatible with the legacy camera;
   requesting second video data from the legacy camera;
   receiving the second video data from the legacy camera;
   converting the second video data to a second format that is different than the first format; and
   transmitting the second video data in the second format through the firewall.

7. The method of claim 6, wherein the first format comprises video streaming protocols comprising: real time streaming protocol (RTSP), real time messaging protocol (RTMP), hypertext transfer protocol (HTTP), or real time transport protocol (RTP).

8. The method of claim 1, wherein the camera is: an internet protocol (IP) camera, a universal serial bus (USB) camera, or an analog camera coupled to an analog to IP converter.

9. The method of claim 1, wherein the first information comprises:
   data associated with a sensor or an Internet of Things (IoT) device on the local network or another network to which the local network or device on the local network may be connected, such as a sensor unique identification, a serial number, a sensor type, a location, a sensor reading, a reading value, a translated or interpreted meaning of a reading value or series of reading values in the form of a symbol, a state or representation such as a warning, alarm, notification or text message, a numerical value, a visual representation, an audio signal; or
   other relevant information or data associated with the sensor or conditions relating to an environment of the sensor, such as a relative location of the sensor to another object on a georeferenced or fixed reference coordinate system, a map, a floor plan, or a three-dimensional model.

10. The method of claim 9, wherein the sensor or the IoT device on the local network comprises: a gas sensor; a smoke/fire detector; or a contact closure of a switch or panic button; artificial intelligence or analytics based object, event, condition; state change state detection module that interprets video data, either alone or in concert with other real time, historical or predictive data from other sensors, systems, databases, analytical functions, or information sources, where the sensor itself or when coupled to another device or module causes an alarm, event notification or warning signal to be transmitted to a rules-based or pre-designated recipient agent.

11. The method of claim 1, further comprising:
maintaining the persistent data connection using keep-alive pings; and
receiving second information via the persistent data connection using a same socket used for receiving the first information.

12. The method of claim 1, further comprising:
prior to the transmitting the video, utilizing a rules-based software module in conjunction with the first information received, wherein the utilizing comprises determining a recipient of the video data based on rules that include: event data, sensor data, recipient data, or other criteria,
wherein the event data comprises: an event type, an event severity, an event priority, or a date or time,
wherein the sensor data comprises: a sensor reading, a warning, a state, a condition, a location, or a duration, and
wherein the recipient data comprises an identity of the recipient, location, security classification or authorization level, function, skill, capability, or availability.

13. The method of claim 1, wherein the establishing the persistent data connection occurs after the electronic device is powered.

14. The method of claim 1, wherein the establishing comprises:
receiving a trigger; and
in response to the trigger, establishing the persistent data connection with the signaling server.

15. The method of claim 1, wherein the camera on the local network is coupled to a video management system (VMS), the requesting video data is transmitted via the VMS, and the video data requested is received via the VMS.

16. The method of claim 12, wherein the rules-based software module is included inside the camera.

17. A method for an electronic device, comprising:
receiving a request from a remote video viewing client, wherein the request is based on a map of a local network, wherein the remote video viewing client is not on the local network;
transmitting an event signal based on the request received to a signaling server;
receiving video data from the local network associated with the event signal transmitted; and
transmitting the video data received to the remote video viewing client.

18. A method for an electronic device, comprising:
receiving from a video pusher on a local network, a subscription to a topic relating to the local network;
establishing a persistent data connection with the video pusher, wherein the video pusher is behind a firewall on the local network and the electronic device is on another side of the firewall;
receiving an event signal associated with the local network;
based on the event signal received, transmitting a message via the persistent data connection that designates which camera on the local network streams video data, wherein the message transmitted includes information corresponding to the subscription.

19. The method of claim 18, wherein the message includes instructions for processing the video data that is streamed, comprising: encrypting the video data; changing the resolution or frame rate of a video data; or changing a video compression codec of the video data.

20. The method of claim 18, wherein the message includes instructions comprising:
designating an internet protocol (IP) address or uniform resource locator (URL) of a recipient of the video data streamed;
tiling multiple camera feeds of the local network including the video data streamed, into a single or fewer video streams;
dynamically selecting or switching video streams from multiple cameras on the local network into a single or fewer video streams; or
creating low-resolution thumbnails of the video data streamed.

21. The method of claim 18, wherein the event signal received is based on a first protocol format, and the method further comprises converting the event signal received to a second protocol format that is different than the first protocol format, wherein the message transmitted is based on the second protocol format.

22. The method of claim 18, further comprising:
receiving a second event signal associated with a different local network;
based on the second event signal received, transmitting a second message to a second video pusher indicating which second camera on the different local network streams second video data.

23. The method of claim 18, wherein the transmitting the message is based on real time publication-subscription, data-sync, or request-response protocol, such as, but not limited to, Message Queueing Telemetry Transport (MQTT) protocol, XMPP, STOMP, AMQP, WAMP, JMs, ZeroMQ, or proprietary messaging protocols.

24. The method of claim 17, wherein the event signal corresponds to a subscription to a topic relating to the local network, and wherein the video data corresponds to a camera corresponding to the topic.

* * * * *

UNITED STATES PATENT AND TRADEMARK OFFICE
CERTIFICATE OF CORRECTION

| | |
|---|---|
| PATENT NO. | : 11,496,472 B2 |
| APPLICATION NO. | : 16/684185 |
| DATED | : November 8, 2022 |
| INVENTOR(S) | : Setlur et al. |

It is certified that error appears in the above-identified patent and that said Letters Patent is hereby corrected as shown below:

In the Claims

In Column 14, Lines 17-18, please replace "changing the resolution or frame rate of a video data" with --changing a resolution or frame rate of the video data--.

Signed and Sealed this
Third Day of January, 2023

*Katherine Kelly Vidal*

Katherine Kelly Vidal
*Director of the United States Patent and Trademark Office*